United States Patent [19]
Geesen

[11] 4,224,037
[45] Sep. 23, 1980

[54] METHOD FOR OPERATING MULTIPLE EFFECT EVAPORATORS

[75] Inventor: Donald H. Geesen, Wilcox, Canada

[73] Assignee: PPG Industries Canada Ltd., Regina, Canada

[21] Appl. No.: 892,454

[22] Filed: Apr. 3, 1978

[51] Int. Cl.² ............................................. B01D 9/02
[52] U.S. Cl. ................................... 23/296; 23/302 R
[58] Field of Search ............. 23/296, 298, 303, 302 T, 23/302 R; 159/47 R, 17 R, DIG. 8

[56] References Cited

U.S. PATENT DOCUMENTS

| 1,216,187 | 2/1917 | Trump | 23/296 |
| 2,479,001 | 8/1949 | Burke | 159/47 R |
| 3,028,215 | 4/1962 | Frint | 23/302 T |
| 3,362,457 | 1/1968 | Chiriro | 23/296 |
| 3,365,278 | 1/1968 | Kelly et al. | 23/296 |
| 3,433,603 | 3/1969 | Jeffery | 23/300 |
| 3,704,101 | 11/1972 | Kelly | 23/296 |

Primary Examiner—Hiram H. Bernstein
Attorney, Agent, or Firm—Walter M. Benjamin

[57] ABSTRACT

Disclosed is an improved method of recovering a salt having a solubility which increases with increasing temperatures from a multiple salt aqueous solution also containing a salt having a solubility which increases less with increasing temperatures than the solubility of the salt to be recovered. The solution is subjected to multiple effect evaporation having a plurality of evaporator effects operating at progressively higher temperatures. In the improved method, a means is provided whereby the mother liquor effluent overflow from the hottest evaporator effect is saturated with the salt to be recovered. Additionally, solution being concentrated in other effects having at least one preceding cooler evaporator effect may be allowed to become saturated with respect to the salt to be recovered. A slurry of the salt having a solubility increasing less with temperature is withdrawn from all effects. This slurry is recycled from effects operated at saturation with respect to the salt to be produced and fed to at least one cooler effect. The solution in at least one cooler effect is concentrated to less than saturation with respect to the salt to be recovered. Thus, the solids of the slurry withdrawn from the cooler effect is not introduced back into the evaporation system thereby purging in a heat efficient manner the salt having a solubility increasing less with temperature.

8 Claims, 2 Drawing Figures

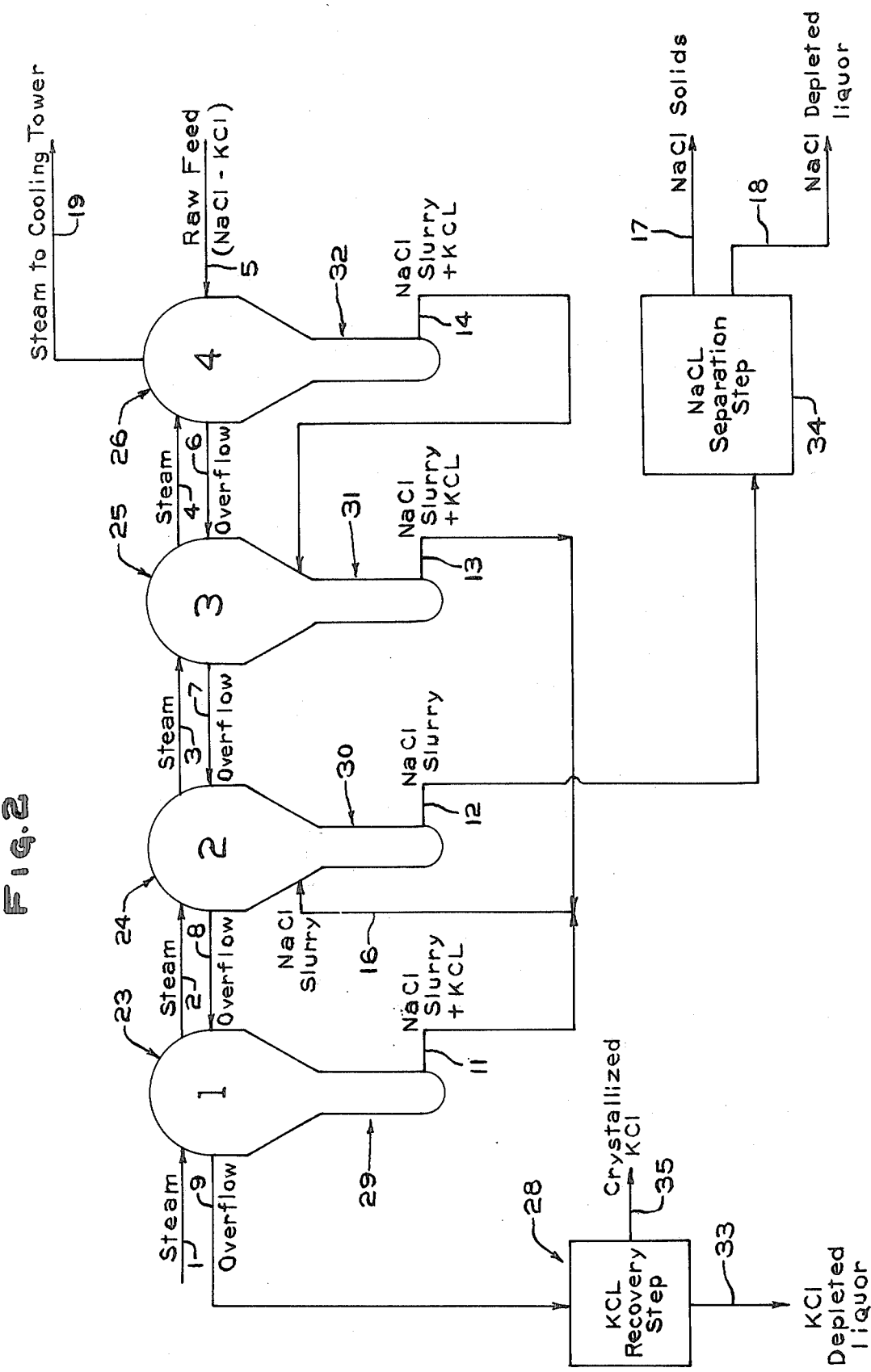

METHOD FOR OPERATING MULTIPLE EFFECT EVAPORATORS

BACKGROUND OF THE INVENTION

This invention relates to an improved method of recovering a salt from a multiple salt solution which is subjected to multiple effect evaporation. More particularly, this invention relates to an improved method of recovering a salt that has a solubility which increases with increasing temperatures from an aqueous solution containing another salt that has a solubility increasing less with increasing temperature by subjecting the solution to multiple effect evaporation having a plurality of evaporator effects operating at progressively higher temperatures.

A salt having a solubility which increases with increasing temperatures, hereinafter called a first salt, can be recovered from an aqueous solution containing another salt having a solubility increasing less with increasing temperature, hereinafter called a second salt. Water is removed from the solution, usually by evaporation, at such a temperature that the solution is brought to near its "invariant composition" without substantially precipitating the first salt. By "invariant composition" is meant the composition at which the aqueous solution is saturated with respect to two or more salts, e.g., saturation with respect to both the first salt and the second salt at a given temperature. The solution is then forwarded to a first salt recovery step, e.g., crystallization by cooling. In the process of removing water from the solution, second salt is usually precipitated therefrom if the second salt was initially in high enough concentration.

Potassium chloride, a first salt, is recovered from an aqueous solution containing both potassium chloride and sodium chloride, a second salt, by a process which entails first removing a portion of water from the solution by evaporation until the solution reaches its invariant composition. Evaporation is carried out at such a temperature that sodium chloride is precipitated preferentially owing to its solubility characteristic which causes it to be present in amounts exceeding its solubility while potassium chloride remains in solution. The sodium chloride depleted solution is then cooled causing the solubility of potassium chloride to be exceeded owing to its solubility characteristic thereby precipitating preferentially potassium chloride while the residual sodium chloride remain in solution. The invariant composition of potassium chloride-sodium chloride solutions is affected by other solutes in the solution. For example, a few parts of magnesium chloride per 100 parts of water will reduce the invariant composition of a potassium chloride-sodium chloride solution by a few parts of each salt per 100 parts water at a given temperature. Thus, evaporation is carried out with this factor in consideration.

Concentration of potassium chloride-sodium chloride solutions entails passing the solution through a plurality of evaporator effects operated at progressively higher temperatures in the direction of the flow of the solution concentrated therein, often described as backward feed. Each evaporator effect is in communication with an elutriation leg at the bottom thereof. Each evaporator effect is typically heated by steam forwarded from effect to effect opposite to the flow of solution being concentrated. The first evaporator effect is heated by steam from an external source, and the vapor therefrom heats the second evaporator effect. Vapor from the second evaporator effect heats the third evaporator effect and so on. Thus, the first evaporator effect operates at the highest temperature and the last evaporator effect operates at the lowest temperature.

Raw feed solution is fed into the last evaporator effect wherein it is concentrated with respect to potassium chloride and sodium chloride. If sodium chloride is in high proportion, as evaporation occurs the solution will first become saturated with respect to sodium chloride which will be the only salt to precipitate until the solution becomes saturated with respect to potassium chloride. Thereafter, and in subsequent hotter evaporator effects, the solution remains saturated with respect to sodium chloride notwithstanding higher solution temperatures because its solubility increases little with increasing temperatures. Hence, further evaporation at the higher temperatures will cause further precipitation of additional sodium chloride and further concentration in the solution of potassium chloride. Consequently, a large quantity of sodium chloride can be precipitated during evaporation. To avoid accumulation of this precipitated sodium chloride in the evaporators, slurry rich in precipitated sodium chloride is withdrawn from each evaporator effect. The withdrawn slurry is forwarded to a recovery step in which sodium chloride is removed or recycled to hotter evaporator effects. See, for example, U.S. Pat. No. 3,365,278 and U.S. Pat. No. 3,704,101.

In the cooler evaporator effects, e.g., third or fourth evaporator effect in a four effect evaporator system, the solution therein is near saturation with respect to potassium chloride. Due to raw feed salt composition fluctuations, various stream temperature fluctuations and other factors, operation at or near the invariant composition results in excess evaporation thereby causing precipitation of potassium chloride along with the precipitating sodium chloride. To avoid losing potassium chloride as a contaminant in the sodium chloride in the sodium chloride recovery step, the slurry withdrawn from the cooler evaporators (which is rich in precipitated sodium chloride but nevertheless contains an appreciable content of precipitated potassium chloride) is forwarded to the hotter evaporators where precipitated potassium chloride is redissolved. Thus, the slurry withdrawn from the hotter evaporator effects, e.g., the first and second evaporator effects in a four effect evaporator system, is forwarded to the recovery step where sodium chloride is removed. Consequently, potassium chloride is kept in solution in the hotter evaporator effects by maintaining the solution in the hotter evaporator effects at less than 100 percent saturation with respect to potassium chloride, i.e., the solution is maintained between 85 and 98 percent saturation with respect to potassium chloride. Thus, virtually no precipitated potassium chloride is forwarded to the recovery step where sodium chloride is removed since virtually no precipitated potassium chloride is withdrawn from the hotter evaporator effects.

More potassium chloride can be recovered in the recovery step where potassium chloride is removed, however, if the hottest evaporator effect were allowed to be maintained at 100 percent saturation or above and potassium chloride precipitated thereby is somehow reclaimed.

SUMMARY OF THE INVENTION

According to the present invention, it has been found that the mother liquor effluent overflow of the hotter evaporator effects, especially the first (and hottest) evaporator effect, may be maintained at 100 percent saturation with respect to the first salt without losing precipitated first salt along with the precipitated second salt as a contaminant in the recovery step where the second salt is removed. This is accomplished by recycling the slurry rich in precipitated second salt and containing appreciable amounts of first salt and which was withdrawn from the hotter evaporator effects. This slurry is recycled to cooler evaporator effects thereby selectively redissolving the precipitated first salt which otherwise would remain precipitated with the precipitated second salt. In the cooler evaporator effect to which this recycle is forwarded only the second salt is precipitated because the mother liquor of the cooler evaporator effect is maintained at less than saturation with respect to the first salt. Slurry withdrawn from the cooler evaporator effect which is rich in precipitated second salt is then forwarded to the recovery step where the second salt is removed. Thus, the overflow from the first evaporator effect will contain greater amounts of the first salt to be produced since the overflow from this evaporator effect will be saturated with respect to first salt. An added benefit of this invention is steam economy since the cooler evaporator effect utilizes the heat content of the precipitated salt slurry recycled from the hotter evaporator effects. Consequently, the cost of operation of the multiple effect evaporation system is reduced. Also, second salt removed to the second salt recovery step will be cooler and therefore will remove less heat from the system.

BRIEF DESCRIPTION OF THE DRAWINGS

The present invention will be better understood by reference to the accompanying drawings wherein:

FIG. 2 is a diagram of a multiple effect evaporation system comprising four evaporator effects operating at progressively higher temperatures wherein the solid slurry effluents from the first and third evaporator effects are recycled to the second evaporator effect.

DETAILED DESCRIPTION OF THE INVENTION

Figure 1:
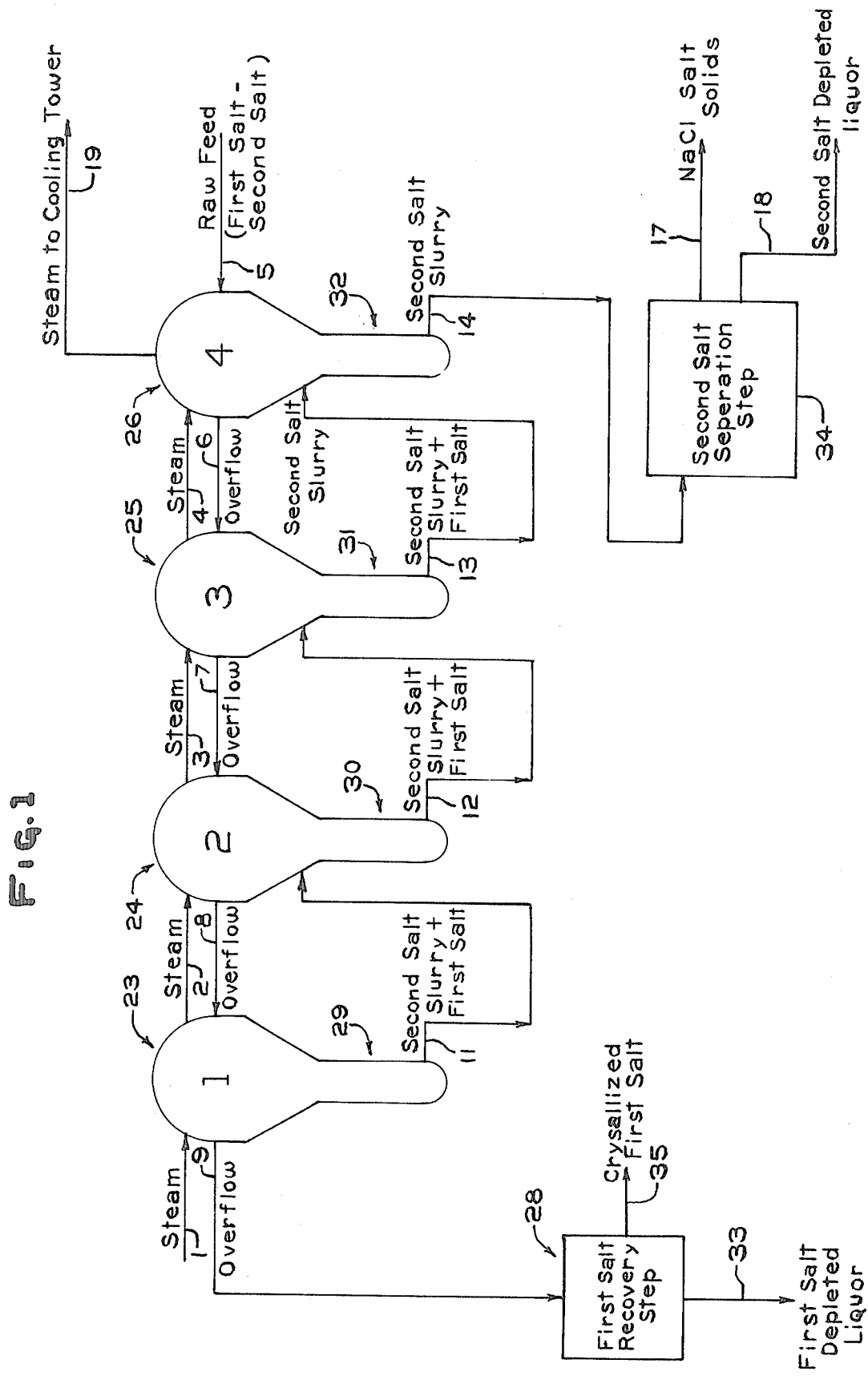
FIG. 1 is a diagram of a multiple effect evaporation system comprising four evaporator effects operating at progressively higher temperatures wherein all solid slurry effluents from the hotter evaporator effects are recycled to the next cooler evaporator effect.

According to the present invention, solid slurry effluents withdrawn from the hotter evaporator effects are recycled to cooler evaporator effects thereby allowing the hotter evaporator effects to operate at saturation with respect to a first salt being concentrated in a solution containing a first salt and a second salt.

In accordance with this invention, the first salt can be any salt which has a solubility which increases with increasing solution temperatures within a given temperature range. Accordingly, first salts include potassium chloride, magnesium chloride, sodium carbonate, and sodium chlorate. The second salt can be any salt which has a solubility which increases less with increasing solution temperatures within the same temperature range and within a temperature range in which evaporation can be carried out. Accordingly, second salts contemplated within the scope of this invention include salts that have a solubility which increases little or decreases with increasing solution temperatures such as sodium chloride, calcium sulfate, and magnesium sulfate. The first and second salts should not be chemically reactive nor should their presence relative to each other adversely affect their solubility characteristic such that their relative solubilities are significantly changed. The present invention will be described with reference to potassium chloride as the first salt and sodium chloride as the second salt. It will become apparent to those skilled in the art that other salts as hereinbefore described can be substituted therefor.

The solutions concentrated by the present invention are aqueous solutions. The concentration of salts in the raw feed solution fed into the last evaporator effect range from the invariant composition at the temperature of the raw feed solution to compositions more dilute than the invariant composition. It is preferred that the raw feed solution be as near saturation as is practical with respect to at least potassium chloride (first salt) and more preferably at the invariant composition at the raw feed temperature. This minimizes the amount of evaporation necessary to reach the invariant composition at the temperature of the last evaporator effect.

To illustrate the concept of this invention, reference is made to FIG. 1 which shows four evaporator effects operated in series for concentrating, for the purpose of this description, a potassium chloride-sodium chloride solution. Each evaporator effect, 1, 2, 3, and 4, comprise an evaporator, 23, 24, 25, and 26, respectively, and an elutriation leg, 29, 30, 31, and 32, respectively. In this series of evaporator effects, a potassium chloride-sodium chloride raw feed solution is introduced into the fourth evaporator effect 4 via stream 5. There is no significant variation in salt concentration of the raw feed solution. The raw feed solution is concentrated by evaporation in the fourth evaporator effect 4 until the solution is substantially saturated with respect to both salts. The raw feed solution is typically more saturated with respect to sodium chloride since potassium chloride containing ore, for example, typically contains a high proportion of sodium chloride. In the process of concentrating the raw feed solution, sodium chloride will be selectively precipitated out in the fourth evaporator effect 4 since, as described, the solubility of sodium chloride is not substantially increased by the increase in temperature of the raw feed solution in the fourth evaporator effect temperature. The solution in the fourth effect evaporator 4 will be concentrated with respect to potassium chloride until it is very close to its invariant composition with respect to potassium chloride and sodium chloride at the operating temperature of that evaporator. The solution in the fourth evaporator effect 4 should reach at least 85 percent saturation with respect to potassium chloride and preferably about 98 percent saturation with respect to potassium chloride.

Overflow from the fourth evaporator effect 4 is fed into the third evaporator effect 3 via stream 6. Since the third evaporator effect 3 is operated at a higher temperature than the fourth evaporator effect 4, the overflow solution from the fourth evaporator effect 4 is further concentrated therein with respect to potassium chloride and precipitates further sodium chloride. The solution is concentrated in the third evaporator effect until it reaches its invariant composition, i.e., 100 percent saturation with respect to potassium chloride at the temperature of the third evaporator effect 3. As sodium chloride is precipitated in the third evaporator effect 3, a small but economically significant amount of potassium chloride will also precipitate owing to inadvertently exceeding saturation with respect to potassium chloride when maintaining the solution therein at 100 percent saturation with respect to potassium chloride.

The overflow from the third evaporator effect 3 is fed into the second evaporator effect 2 via stream 7. Again, since the second evaporator effect 2 is operated at a higher temperature than the third evaporator effect 3, the solution is further concentrated, thereby precipitating more sodium chloride and saturating the solution with respect to potassium chloride. Also, in the second evaporator effect 2, the solution is concentrated until the invariant composition is reached, i.e., until it is 100 percent saturated with respect to potassium chloride. Consequently and inadvertently, a small amount of potassium chloride will precipitate in the second evaporator effect. The overflow 8 from the solution in the second evaporator effect 2 is forwarded to the first evaporator effect 1. The first evaporator effect 1, being operated at a higher temperature than the second evaporator effect 2, further concentrates the solution until the invariant composition for that temperature is reached and potassium chloride begins to precipitate as in the second evaporator effect 2.

The precipitated salts in the first, second, and third evaporator effects 1, 2, and 3 fall to the bottom of the evaporator effects into the elutriation legs 29, 30, and 31, respectively. The slurry rich in precipitated sodium chloride and containing small amounts of potassium chloride that is withdrawn from the first evaporator effect 1 is recycled via stream 11 to the second evaporator effect 2. Likewise, similar slurries withdrawn from the second and third evaporator effects 2 and 3 via streams 12 and 13, respectively, are recycled to the third and fourth evaporator effects 3 and 4, respectively. In this manner, slurry is serially recycled through adjacent evaporator effects to the cooler evaporator effect. A slurry rich in precipitated sodium chloride but containing virtually no precipitated potassium chloride is withdrawn from the fourth evaporator effect via stream 14 and forwarded directly to the separation step 34 where sodium chloride is removed via stream 17 and the sodium chloride depleted liquor is removed via stream 18.

The first evaporator effect 1 is heated by an external steam source via stream 1. Thus, the first evaporator effect 1 is the hottest evaporator effect. The vapors from the first evaporator effect 1 are forwarded to the second evaporator effect 2, thereby supplying the heat for the second evaporator effect 2 via stream 2. Likewise, the third and fourth evaporator effects 3 and 4 are heated by the vapors from the second and third evaporator effects 2 and 3, respectively, via streams 3 and 4, respectively. The vapors from the fourth evaporator effect 4, the coldest evaporator, are forwarded to a cooling tower via stream 19.

The overflow stream 9 from the first evaporator effect 1 is forwarded to the recovery step 28 where potassium chloride is removed via stream 35 and the potassium chloride depleted liquor is removed via stream 33.

From an examination of FIG. 1, it can be seen that the heat content of the hotter evaporator effects 1, 2, and 3 is being utilized by the cooler evaporator effects 2, 3, and 4 not only owing to the vapor forwarded thereto, but also owing to the slurries containing the precipitated salts being introduced into the cooler evaporator effects. It can also be seen that since the overflow solutions from the third, second, and first evaporator effects are 100 percent saturated with respect to potassium chloride, overflow stream 9 from the first evaporator effect 1, contains a higher concentration of potassium chloride for the potassium chloride recovery step 28. Slurry rich in precipitated sodium chloride, which is withdrawn from the coldest evaporator effect 4, does not remove as much heat from the system as a slurry withdrawn from a hotter evaporator effect.

This invention is further illustrated by contrasting a case where the invention is used with a case where it is not. For the first case, a plurality of evaporator effects similar to that shown in FIG. 1 is used. A raw feed solution containing 30 parts sodium chloride per 100 parts water and 17 parts potassium chloride per 100 parts water is introduced into the fourth evaporator effect 4 via stream 5. The fourth evaporator effect 4 is operated at 47° C. The fourth evaporator effect at that temperature is operated such that the overflow solution therefrom is 100 percent saturated with respect to potassium chloride and sodium chloride. This mother liquor effluent overflow is forwarded to the third evaporator effect via stream 6. The overflow stream 6 contains 29 parts sodium chloride per 100 parts water and 21 parts potassium chloride per 100 parts water. This overflow stream 6 is further concentrated in the third evaporator effect until the invariant composition is approached. The overflow stream 7, from the third evaporator effect 3, contains 24 parts potassium chloride per 100 parts water and 26 parts sodium chloride per 100 parts water and is forwarded to the second evaporator effect 2, which is operated at 87° C. The solution in the second evaporator effect 2 is concentrated until it is 92 percent saturated with respect to potassium chloride, that is below its invariant composition at the solution temperature. Solution is withdrawn from the second evaporator effect via overflow stream 8, which contains 25 parts sodium chloride per 100 parts water and 27 parts potassium chloride per 100 parts water and forwarded to the first evaporator effect 1 which is operated at 110° C. The solution in the first evaporator effect is concentrated until it is 100 percent saturated with respect to potassium chloride, that is, until it has reached its invariant composition at the solution temperature. The overflow stream 9 from the first evaporator effect 1 contains 23 parts sodium chloride per 100 parts water and 35 parts potassium chloride per 100 parts water. This overflow stream is forwarded to the potassium chloride recovery step 28 in which the potassium chloride content thereof is reduced to 14 parts potassium chloride per 100 parts water and is removed via stream 35 and potassium chloride depleted liquor is removed via stream 33.

A slurry rich in precipitated sodium chloride and containing a small amount of potassium chloride is withdrawn from the first evaporator effect 1 via stream 11 containing 40 parts potassium chloride per 100 parts water and 150 parts sodium chloride per 100 parts water. Likewise, a similar slurry is withdrawn from the third and fourth evaporator effects 3 and 4 via streams 13 and 14, respectively, which contains 21 parts potassium chloride per 100 parts water and 173 parts sodium chloride per 100 parts water, and 27 parts potassium chloride per 100 parts water, and 142 parts sodium chloride per 100 parts water, respectively. The heat content of the slurry withdrawn from the first evaporator effect via stream 11 is 253 joules per kilogram of potassium chloride product. streams 11 and 13 are recycled to the second evaporator effect 2 via stream 16. Stream 14 is recycled to the third evaporator effect. Therefore, a total of 21 parts potassium chloride per 100 parts water and 172 parts of sodium chloride per 100 parts water is forwarded to the separation step 34 via stream 12. Solid sodium chloride is removed from the sodium chloride separation step 34 via stream 17. Sodium chloride depleted liquor is removed from the sodium chloride separation step via stream 18. The amount of potassium chloride lost in the sodium chloride separation step (because of cooling and solution adhered to sodium chloride solids) is 42 kilograms per 1000 kilograms of potassium chloride product. An amount of 4.97 million joules per kilogram of potassium chloride product in introduced into the first evaporator effect 1, via stream 1, and 3.43 million joules per kilogram of potassium chloride product is removed from the fourth evaporator effect 4 via stream 19 and forwarded to a cooling tower.

For the second case, a plurality of evaporator effects similar to that described in the first case is used. A raw feed identical to the raw feed of the first case is concentrated. In this second this case, streams 11 and 12 are fed to the separation step 34 where sodium chloride is removed. Also, the first evaporator effect 1 is operated between 85 and 98 percent saturation with respect to potassium chloride. Consequently, the overflow streams 6, 7, 8, and 9 contain 28 parts sodium chloride per 100 parts water and 21 parts potassium chloride per 100 parts water; 26 parts sodium chloride per 100 parts water; 24 parts potassium chloride per 100 parts water; 25 parts sodium chloride per 100 parts water; 28 parts potassium chloride per 100 parts water; and 24 parts sodium chloride per 100 parts water and 34 parts potassium chloride per 100 parts water, respectively. Therefore a total of 22 parts of potassium chloride per 100 parts water and 172 parts sodium chloride per 100 parts water is forwarded to the recovery step 34 where sodium chloride is removed. Solid sodium chloride is removed from the sodium chloride separation step via stream 17, leaving the sodium chloride depleted liquor of stream 18. 50.3 kilograms of potassium chloride per 1000 kilograms of potassium chloride product is lost in the sodium chloride separation step 34. The amount of steam required to heat the system and introduced into the first evaporator effect 1, via stream 1, is 5.08 million joules per kilogram of potassium chloride product and 3.48 million joules per kilogram of potassium chloride product is removed from the fourth evaporator effect 4 via stream 19 and forwarded to a cooling tower.

it can be seen that in comparing the first and second cases, 0.10 million joules per kilogram of potasssium chloride product is saved in the first case as a result of recyclng via stream 11 and an additional 8.3 kilograms of potassium chloride is produced per each 1000 kilograms of potassium chloride produced.

Many alterations and modifications will be apparent to those skilled in the art of concentrating salt solutions by evaporation. Thus, the present invention entails recycling slurry rich in precipitated second salt to a cooler evaporator effect to maintain the mother liquor of the hotter evaporator effect at 100 percent saturation with respect to the first salt; mother liquor of the cooler evaporator effect is maintained at less than 100 percent saturation with respect to the first salt and the solid portion of the slurry withdrawn from the cooler evaporator effect is not introduced back into the evaporation system. So long as such recycling is present, the mother liquor effluent overflows and withdrawn slurries of uninvolved evaporator effects of the multiple effect system may be treated in any of various ways, such as taught by U.S. Pat. No. 3,365,278 and U.S. Pat. No. 3,704,101. It is important, however, that the amount of slurry rich in precipitated second salt and containing a small but economically significant amount of first salt is less than the amount required to exceed the invariant composition of the solution with respect to potassium chloride in the cooler evaporator effect. Likewise, it is important that the amount of first salt allowed to precipitate in the hotter evaporator effect be less than the amount required to exceed the invariant composition with respect to potassium chloride of the cooler evaporator effect into which the recycled slurry is introduced and from which the solid portion of withdrawn slurry is not recycled back to the evaporator. Therefore, all of the slurry rich in precipitated second salt withdrawn from the hotter evaporator effect can be introduced into the cooler evaporator effect. This is particularly true when slurries from more than one hotter evaporator effects are combined before introduction into one cooler evaporator effect.

The present invention is utilized best when two conditions are met. There should be no variations within a limited range in the operating temperatures of the cooler evaporator effects wherein the mother liquor is maintained at less than 100 percent saturation with respect to the first salt; and, there should be essentially limited variation in the invariant composition of the solution in the cooler evaporator effects wherein the mother liquor is maintained at less than 100 percent saturation with respect to the first salt, the variations in the invariant composition occurring because of variations in salt impurities concentrations. Additionally, when the first salt concentration in the raw feed solution is low, e.g., less than about 14 parts potassium chloride per 100 parts water in a potassium chloride-sodium chloride system, the present invention is utilized best when there are limited variations in the concentration of the raw feed solution.

When none of the conditions for the best utilization of the present invention exists, the best mode in an at least 3 effect evaporator system is to allow the concentration of the first salt in the mother liquor of all the evaporator effects except the second evaporator effect to be maintained at 100 percent saturation with respect to the first salt and the mother liquor of the second evaporator effect to be maintained at less than 100 percent saturation with respect to the first salt. In this embodiment of the invention, the slurries withdrawn from all the evaporator effects except the second evaporator effect are introduced serially through adjacent evaporator effects into the second evaporator effect as shown in FIG. 2. Thus, this embodiment allows the mother liquor of the first evaporator effect to be saturated with respect to the first salt, thereby yielding more first salt for product recovery. Furthermore, this embodiment incorporates the prior art practices of avoiding losing first salt due to variations of salt concentration in the raw feed solutions by allowing the cooler evaporator effects into which the raw feed solution are introduced to concentrate the solution therein to 100 percent saturation with respect to the first salt (see U.S. Pat. No. 3,704,101). It will be apparent to those skilled in the art that other intermediate evaporator effects other than the second evaporator effect may be the cooler evaporator effect to which the slurry is recycled and from which slurry is withdrawn and forwarded to the recovery step where the second salt is removed.

While the present invention has been described by reference to certain details, it is not intended that the invention be construed as so limited, except insofar as such details are recited in the claims.

What is claimed is:

1. In the recovery of a first salt from an aqueous solution containing the first salt and a second salt, the first salt having a solubility increasing more with increasing temperatures than the solubility of the second salt, wherein water is removed from the solution by multiple effect evaporation having a plurality of evaporator effects operated at progressively higher temperatures, the first evaporator effect of which is the hottest, and having backward overflow feed, and wherein mother liquor effluent overflow from the first evaporator effect is forwarded to a first salt recovery step and wherein a slurry rich in precipitated second salt is withdrawn from each evaporator effect, the improvement which comprises operating the multiple effect evaporators to provide a mother liquor effluent overflow from the first evaporator effect which is substantially saturated with respect to first salt by:
   (1) maintaining the concentration of first salt in the mother liquor of the first evaporator at 100 percent saturation;
   (2) maintaining the concentration of the first salt in the mother liquor of at least one evaporator effect cooler than the first evaporator effect at less than 100 percent saturation;
   (3) recycling the slurry rich in precipitated second salt withdrawn from the first evaporator effect to the cooler evaporator effect; and
   (4) withdrawing the slurry rich in precipitated second salt from the cooler evaporator effect as purge of second salt from the system.

2. The method of claim 1, wherein the slurry rich in precipitated second salt withdrawn from all evaporator effects hotter than the cooler evaporator effect is recycled serially through its adjacent evaporator effect to the cooler evaporator effect.

3. The method of claim 1, wherein the concentration of the first salt in the mother liquor of the cooler evaporator effect is between 85 and 98 percent saturation.

4. The method of claim 1, wherein the slurry rich in precipitated second salt recycled to the cooler evaporator effect is less than an amount to exceed 100 percent saturation of first salt in the solution in the cooler evaporator effect.

5. In the recovery of potassium chloride from an aqueous solution containing potassium chloride and sodium chloride, wherein water is removed from the solution by multiple effect evaporation having a plurality of evaporator effects operated at progressively higher temperatures, the first effect of which is the hottest, and having backward overflow feed, and wherein mother liquor effluent overflow from the first evaporator effect is forwarded to a potassium chloride recovery step and wherein a slurry rich in precipitated sodium chloride is withdrawn from each evaporator, the improvement which comprises allowing a means of producing in a heat efficient manner a mother liquor effluent overflow from the first evaporator effect more concentrated in potassium chloride by:
   (1) maintaining the concentration of potassium chloride in the mother liquor of the first evaporator effect at 100 percent saturation;
   (2) maintaining the concentration of potassium chloride in the mother liquor in at least one evaporator effect cooler than the first evaporator effect at between 85 and 98 percent saturation;
   (3) recycling the slurry rich in precipitated sodium chloride withdrawn from the first evaporator effect to the cooler evaporator effect; and
   (4) withdrawing slurry rich in precipitated sodium chloride from the cooler evaporator effect as purge of sodium chloride from the system.

6. The method of claim 5, wherein the slurry rich in precipitated sodium chloride withdrawn from all evaporator effects hotter than the cooler evaporator effect is recycled serially through its adjacent evaporator effect to the cooler evaporator effect.

7. In the recovery of potassium chloride from an aqueous solution containing potassium chloride and sodium chloride, wherein water is removed from the solution by multiple effect evaporation having at least 3 evaporator effects operated at progressively higher temperatures, the first effect of which is the hottest and having backward overflow feed and wherein the mother liquor effluent overflow from the first effect is forwarded to a potassium chloride recovery step and wherein the potassium chloride concentration in the mother liquor effluent of the evaporator effects cooler than the second evaporator effect is maintained at saturation with respect to potassium chloride and wherein a slurry rich in precipitated sodium chloride is withdrawn from the second evaporator effect and forwarded to a sodium chloride recovery step, the improvement which comprises allowing a means of producing in a heat efficient manner a mother liquor effluent overflow from the first evaporator effect more concentrated in potassium chloride by:
   (1) maintaining the concentration of potassium chloride in the mother liquor in the first effect evaporator at 100 percent saturation;
   (2) maintaining the concentration of potassium chloride in the mother liquor of the second evaporator effect at less than 100 percent saturation;
   (3) recycling the slurry rich in precipitated sodium chloride withdrawn from the first evaporator effect to the second evaporator effect; and
   (4) withdrawing slurry rich in precipitated sodium chloride from the second evaporator effect as purge of sodium chloride from the system.

8. The method of claim 7, wherein the concentration of potassium chloride in the second evaporator effect is between 85 and 98 percent saturation.

* * * * *